(No Model.)
J. A. I. CRAIG.
DYNAMO ELECTRIC MACHINE.
No. 277,237. Patented May 8, 1883.
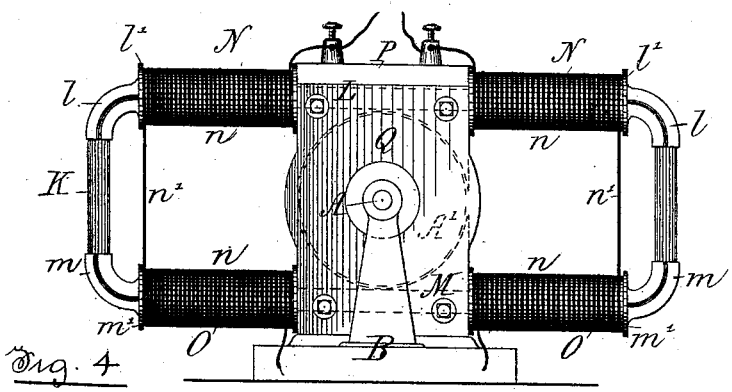
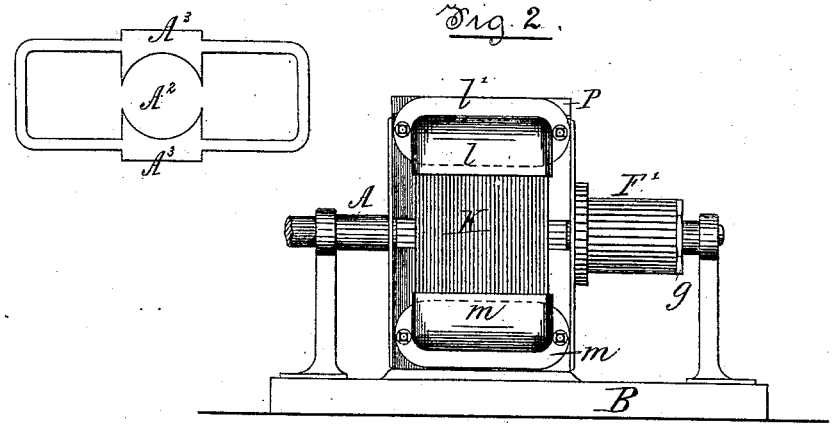
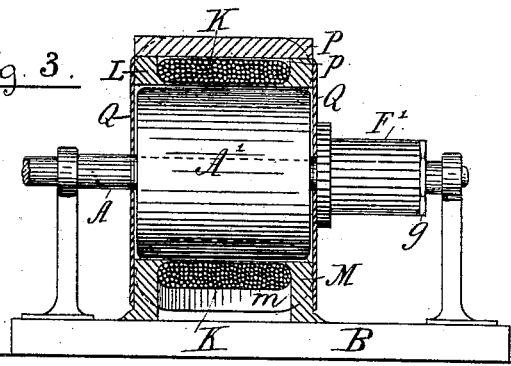

UNITED STATES PATENT OFFICE.

JOSEPH A. I. CRAIG, OF MONTREAL, QUEBEC, CANADA.

DYNAMO-ELECTRIC MACHINE.

SPECIFICATION forming part of Letters Patent No. 277,237, dated May 8, 1883.

Application filed September 7, 1882. (No model.)

*To all whom it may concern:*

Be it known that I, JOSEPH A. I. CRAIG, of the city of Montreal, in the district of Montreal, and Province of Quebec, Canada, have invented certain new and useful Improvements in Dynamo-Electric Machines; and I do hereby declare that the following is a full, clear, and exact description of the same.

This invention relates to an improved construction and arrangement of field-magnets of a dynamo-electric machine, which may be briefly stated as consisting in a core of soft-iron wire wound in an elongated or other suitable form, provided with elbows to preserve the shape of same, and separate or independent polar extensions, the said wire core being again covered with insulated wire wound transversely on the same.

The object of my invention is to increase the efficiency of the parts while working and allow the same to be readily put in place for operation or taken apart when required, while greatly lessening the cost of the apparatus.

Many other advantages will accrue from the use of my invention, which will be apparent to those skilled in the art to which it pertains. For full comprehension of the same, reference must be had to the accompanying drawings, in which letters similar to those used in the following description indicate like parts, and where—

Figure 1 is a side elevation of a dynamo-electric machine, showing arrangement of my improved field-magnets. Fig. 2 is an end elevation of the same. Fig. 3 is a sectional elevation of the same, and Fig. 4 a detail view of sheet-metal plate or core-section used in the modified form of magnet.

Letter A represents the armature-shaft. A' represents in outline any suitable armature; F', the commutator, of whatever construction may be found most desirable, and B the framework supporting said parts, as shown, no claim being laid to any of these parts.

In constructing the field-magnets for my dynamo-electric machine I do away with the solid iron core at present used and wind upon a suitable mold-block a sufficient number of coils (represented by K) of soft-iron wire, suitable elbows, $l\ l\ m\ m$, being put in place at each corner or bend of the wire, as shown, for the purpose of keeping the wire coils K close together and in proper form. I generally construct these elbows $l\ m$ in two halves, the outer one of which is put on and secured over the wire after the same is wound. These elbows are constructed with flanges $l'\ m'$, and the ordinary insulated wire, $n$, is wound around the wire core K transversely, in the same manner as at present, thus forming helices N N O O between the elbow-flanges and the polar extensions L M, which are of separate and independent pieces of magnetic material, and arranged so as to nearly surround the revolving armature A'. The wire core thus formed passes through grooves or recesses $p$ in the polar extensions L M, and the helices are connected in any approved manner, as will be understood by electricians, a plate, P, being bolted down over said core, as shown, to hold the bundle of wire together.

Q Q are plates, of brass or other suitable non-magnetic material, extending across from one polar extension to the other, being bolted thereto, as shown, for the purpose of binding the same together, the insulation from the poles of the bolts or other devices for attaching said plate thereto being accomplished in any approved way.

In Fig. 4 I have shown a diagram of a sheet-metal plate stamped in one piece to the configuration of the magnet and polar extensions, $A^2$ indicating the space in which the armature revolves, and $A^3\ A^3$ the polar extensions. A suitable number of these plates are placed together and the insulated wire wound round the same in the manner already described for Fig. 1, thus forming a modification of my field-magnet, it being understood that these plates will take the place of the wires K, already alluded to as forming the core, and the separate cast polar extensions L M are done away with altogether; but I do not claim this modification in the present application, reserving for myself the right of applying for a separate patent therefor.

By my invention I am enabled to construct a field-magnet in a very short time and for a small proportion of the cost necessary in the present arrangement, besides reducing the cost of the other dependent parts of the dynamo-electric machine, as it will be apparent that much of the framing, &c., can be done away with.

Suitable line-connections, commutator-brushes, driving-pulley, &c., will of course be necessary for the working of my improved dynamo-electric machine; but as these parts form no part of my invention and may be of any desired pattern, I have not thought it necessary to indicate or describe the same.

I do not claim in the present application the field-magnet made up of a number of thin plates of metal piled together and wound with insulated wire, but reserve the right to make a separate application for a patent on the same.

What I claim, and desire to secure by Letters Patent, is as follows:

In a dynamo-electric machine, the combination of a continuous helix, K, of iron wire, forming the core of the field-magnet, with separate polar extensions L M, each provided with a groove or recess, $p$, for the reception of said core, elbows $l\ l\ m\ m$, placed at the bends of said helical core for clamping the same, and magnet-coils N N O O, wound over said core, all substantially as specified.

JOSEPH A. I. CRAIG.

Witnesses:
R. A. KELLOND,
J. A. RENNIE.